US012665434B2

(12) United States Patent
Kiefer et al.

(10) Patent No.: US 12,665,434 B2
(45) Date of Patent: Jun. 23, 2026

(54) METHODS AND SYSTEMS FOR PERFORMING ACTIVE DISCHARGE USING AN ACTIVE DISCHARGE CIRCUIT AND AN AUXILIARY CIRCUIT

(71) Applicant: BorgWarner Luxembourg Automotive Systems S.A., Bascharage (LU)

(72) Inventors: Walter Kiefer, Perl (DE); Tillasthanam V. Sriram, Carmel, IN (US)

(73) Assignee: Borg Warner Luxembourg Automotive Systems S.A., Bascharage (LU)

( * ) Notice: Subject to any disclaimer, the term of this patent is extended or adjusted under 35 U.S.C. 154(b) by 906 days.

(21) Appl. No.: 18/051,248

(22) Filed: Oct. 31, 2022

(65) Prior Publication Data

US 2024/0146094 A1 May 2, 2024

(51) Int. Cl.
| | |
|---|---|
| *H02J 7/34* | (2006.01) |
| *H02J 7/60* | (2026.01) |
| *H02J 7/96* | (2026.01) |
| *B60L 50/60* | (2019.01) |

(52) U.S. Cl.
CPC .............. *H02J 7/345* (2013.01); *H02J 7/663* (2026.01); *H02J 7/685* (2026.01); *H02J 7/963* (2026.01); *B60L 50/60* (2019.02)

(58) Field of Classification Search
CPC ....................................................... H02J 7/345

USPC ......................................................... 320/166
See application file for complete search history.

(56) References Cited

U.S. PATENT DOCUMENTS

| | | | |
|---|---|---|---|
| 10,017,071 B2 | 7/2018 | Namou et al. | |
| 2011/0057627 A1* | 3/2011 | Kuehner | B60L 3/0046 |
| | | | 320/166 |
| 2013/0181686 A1* | 7/2013 | Ueda | B60L 58/14 |
| | | | 320/166 |
| 2013/0207619 A1* | 8/2013 | Viancino | H03K 17/163 |
| | | | 320/166 |
| 2013/0214745 A1 | 8/2013 | Funaba et al. | |
| 2021/0097785 A1 | 4/2021 | Zhang et al. | |
| 2021/0359591 A1 | 11/2021 | Bucher et al. | |

FOREIGN PATENT DOCUMENTS

| | | |
|---|---|---|
| DE | 102008010980 A1 | 8/2009 |
| DE | 102016222632 A1 | 5/2018 |

* cited by examiner

*Primary Examiner* — Yalkew Fantu
(74) *Attorney, Agent, or Firm* — Joshua M. Haines; Bookoff McAndrews, PLLC

(57) ABSTRACT

A method may include receiving a discharge request to perform discharge of a capacitor of an electric vehicle; closing a first switch a first circuit provided in parallel with a second circuit of the electric vehicle; determining a voltage drop of the capacitor, based on closing the first switch; and closing a second switch of the second circuit to perform the discharge of the capacitor, based on the determining the voltage drop of the capacitor indicating that a battery of the electric vehicle is disconnected from the capacitor.

20 Claims, 6 Drawing Sheets

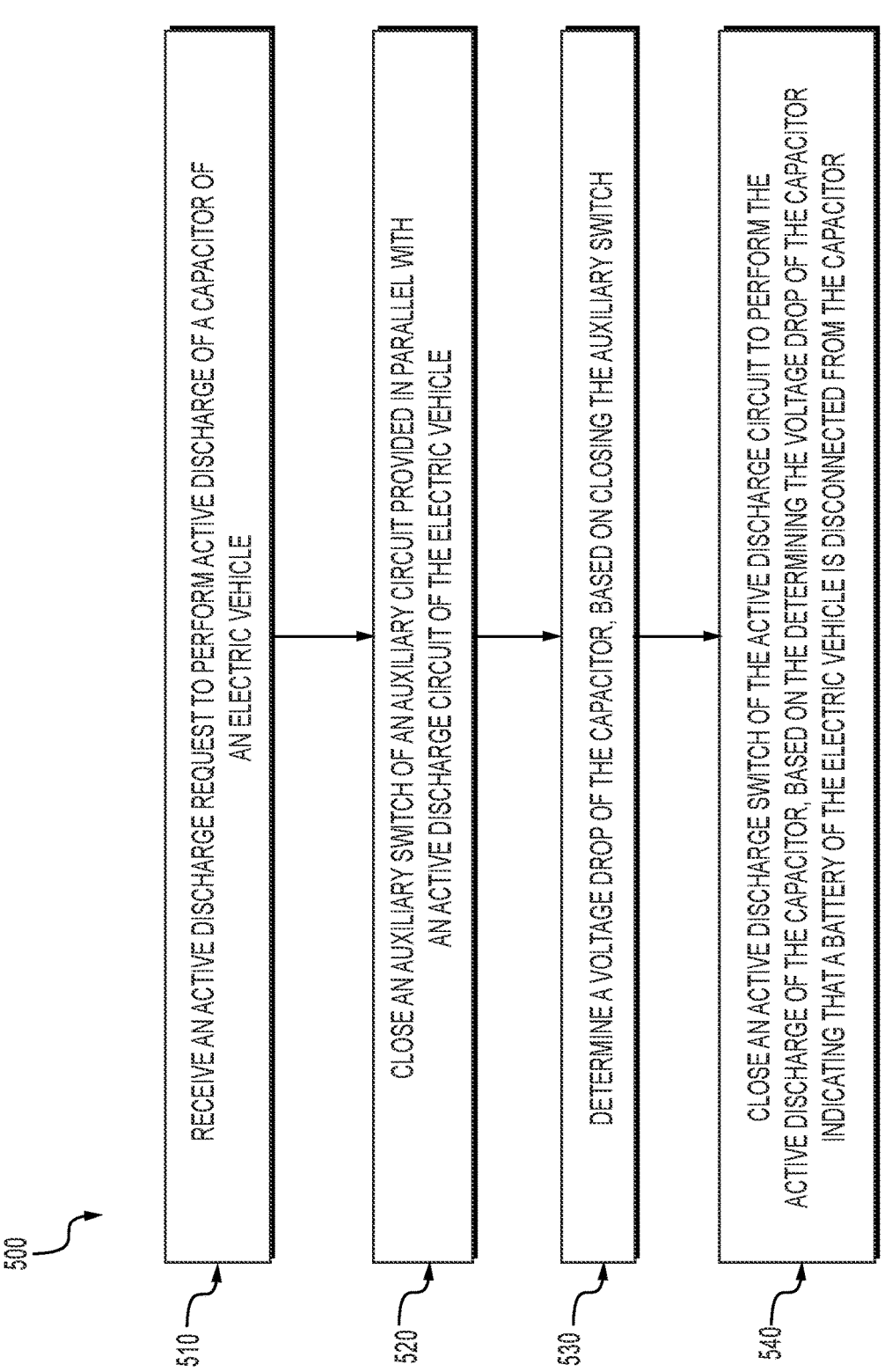

500

510 — RECEIVE AN ACTIVE DISCHARGE REQUEST TO PERFORM ACTIVE DISCHARGE OF A CAPACITOR OF AN ELECTRIC VEHICLE

520 — CLOSE AN AUXILIARY SWITCH OF AN AUXILIARY CIRCUIT PROVIDED IN PARALLEL WITH AN ACTIVE DISCHARGE CIRCUIT OF THE ELECTRIC VEHICLE

530 — DETERMINE A VOLTAGE DROP OF THE CAPACITOR, BASED ON CLOSING THE AUXILIARY SWITCH

540 — CLOSE AN ACTIVE DISCHARGE SWITCH OF THE ACTIVE DISCHARGE CIRCUIT TO PERFORM THE ACTIVE DISCHARGE OF THE CAPACITOR, BASED ON THE DETERMINING THE VOLTAGE DROP OF THE CAPACITOR INDICATING THAT A BATTERY OF THE ELECTRIC VEHICLE IS DISCONNECTED FROM THE CAPACITOR

FIG. 5

METHODS AND SYSTEMS FOR PERFORMING ACTIVE DISCHARGE USING AN ACTIVE DISCHARGE CIRCUIT AND AN AUXILIARY CIRCUIT

TECHNICAL FIELD

The present disclosure relates to methods and systems for performing active discharge using an active discharge circuit and an auxiliary circuit. More specifically, the present disclosure relates to methods and systems for determining that a capacitor of an inverter is disconnected from a battery of an electric vehicle using the auxiliary circuit, and performing active discharge using the active discharge circuit based on determining that the capacitor of the inverter is disconnected from the battery of the electric vehicle.

BACKGROUND

An electric vehicle may include an inverter that changes direct current (DC) from a battery of the electric vehicle to alternating current (AC) for various applications of the electric vehicle. The inverter may include a capacitor (e.g., a DC link capacitor) that is provided in parallel with the battery to reduce voltage variation as the load changes. The capacitor may be connected to the battery via a high voltage switch. The capacitor should be disconnected from the battery via the high voltage switch in response to various conditions such as, for example, a shutdown of the vehicle, a crash of the vehicle, etc. After being disconnected, the capacitor may store a large amount of charge. To dissipate the charge, the capacitor is connected to an active discharge circuit via an active discharge switch. The active discharge circuit may include a resistor to discharge the stored charge. To perform active discharge, the high voltage switch is opened and the active discharge switch is closed.

In some situations, the high voltage switch might remain closed when active discharge is performed. If the battery is still connected to the capacitor via the high voltage switch when the active discharge switch is closed, then the resistor included in the active discharge circuit might be damaged. To mitigate these effects, the active discharge circuit often includes a high power resistor. High power resistors are expensive and consume a large amount of space of the vehicle. Moreover, this approach may generate high power losses. For instance, the power ratings need to be increased by a factor of four for an 800 volt system as compared to a 400 volt system.

In some cases, software protection strategies can be used to limit the power dissipated by active discharge resistors. However, the power ratings and the required space is significant. Moreover, if software protection is applied, a cool time until active discharge is available again may be unacceptably long and prevent immediate active discharge. For instance, software may receive an active discharge request and close an active discharge switch to consume the charge of the bulk capacitor. The software may monitor the bulk capacitor voltage and open the active discharge switch if the voltage does not drop. Power monitoring needs to be done in order to avoid overheating the active discharge resistor by system misbehavior caused by the high voltage switch not being opened, and caused by repetition rate of active discharge requests. System misbehavior may lead to reduced availability of function because of needed cool down time.

SUMMARY

According to an example embodiment, a method may include receiving an active discharge request to perform discharge of a capacitor of an electric vehicle; closing an auxiliary switch of an auxiliary circuit provided in parallel with an active discharge circuit of the electric vehicle; determining a voltage drop of the capacitor, based on closing the auxiliary switch; and closing an active discharge switch of the active discharge circuit to perform the discharge of the capacitor, based on the determining the voltage drop of the capacitor indicating that a battery of the electric vehicle is disconnected from the capacitor.

The method may include determining that the voltage drop of the capacitor is greater than a voltage drop threshold. Closing the second switch comprises closing the second switch based on determining that the voltage drop is greater than the voltage drop threshold and determining that a timeframe of the voltage drop is less than a timeframe threshold.

The method may include determining that a timeframe of the voltage drop is less than a timeframe threshold. Closing the second switch comprises closing the second switch based on determining that the voltage drop of the capacitor is greater than a voltage drop threshold and determining that the timeframe of the voltage drop is less than the timeframe threshold.

The first circuit may include the first switch and a first resistor.

The first circuit may include the first switch, a high voltage power supply, and a first resistor.

The first circuit may include the first switch and a current source.

The first circuit may include the first switch, a high voltage power supply, and a current source.

The method may include, after closing the second switch, determining a second voltage drop of the capacitor; and selectively opening the second switch after closing the second switch based on determining the second voltage drop of the capacitor.

According to an example embodiment, an electric vehicle may include a first circuit; a second circuit configured to perform discharge of a capacitor of the electric vehicle; and a processor configured to: receive a discharge request to perform the discharge of the capacitor of the electric vehicle; close a first switch of the first circuit provided in parallel with the second circuit of the electric vehicle; determine a voltage drop of the capacitor, based on closing the first switch; and close a second switch of the first circuit to perform the discharge the capacitor, based on the determining the voltage drop of the capacitor indicating that a battery of the electric vehicle is disconnected from the capacitor.

The processor may determine that the voltage drop of the capacitor is greater than a voltage drop threshold. The processor, when closing the second switch, is configured to close the second switch based on determining that the voltage drop is greater than the voltage drop threshold and determining that a timeframe of the voltage drop is less than a timeframe threshold.

The processor may determine that a timeframe of the voltage drop is less than a timeframe threshold. The processor, when closing the second switch, is configured to close the second switch based on determining that the timeframe of the voltage drop is less than the timeframe threshold.

The first circuit may include the first switch and a first resistor.

The first circuit may include the first switch, a high voltage power supply, and a first resistor.

The first circuit may include the first switch and a current source.

The first circuit may include the first switch, a high voltage power supply, and a current source.

The processor may, after closing the second switch, determine a second voltage drop of the capacitor; and selectively open the second switch after closing the second switch based on determining the second voltage drop of the capacitor.

According to an example embodiment, a discharge device may include a memory configured to store instructions; and a processor configured to execute the instructions to: receive a discharge request to perform discharge of a capacitor of an electric vehicle; close a first switch of a first circuit provided in parallel with a second circuit of the electric vehicle; determine a voltage drop of the capacitor, based on closing the first switch; and close a second switch of the second circuit to perform the discharge the capacitor, based on the determining the voltage drop of the capacitor indicating that a battery of the electric vehicle is disconnected from the capacitor.

The processor may determine that the voltage drop of the capacitor is greater than a voltage drop threshold. The processor, when closing the second switch, may close the second switch based on determining that the voltage drop is greater than the voltage drop threshold and determining that a timeframe of the voltage drop is less than a timeframe threshold.

The processor may determine that a timeframe of the voltage drop is less than a timeframe threshold. The processor, when closing the second switch, may close the second switch based on determining that the voltage drop of the capacitor is greater than a voltage drop threshold and determining that the timeframe of the voltage drop is less than the timeframe threshold.

After closing the second switch, the processor may determine a second voltage drop of the capacitor; and selectively open the second switch after closing the second switch based on determining the second voltage drop of the capacitor.

It may be understood that both the foregoing general description and the following detailed description are exemplary and explanatory only and are not restrictive of the invention, as claimed.

BRIEF DESCRIPTION OF THE DRAWINGS

FIG. 5 is a flowchart of an example process for performing active discharge using an active discharge circuit and an auxiliary circuit.

DETAILED DESCRIPTION

As addressed above, if active discharge is performed while the battery of the electric vehicle is still connected to the capacitor via the high voltage switch, then the resistor of the active discharge circuit may be damaged. Some embodiments herein provide methods and systems for performing active discharge using an active discharge circuit and an auxiliary circuit. The methods and systems may close the auxiliary circuit before closing the active discharge circuit. The auxiliary circuit includes a load (e.g., a resistor, a high voltage power supply, a current source, etc.) that consumes charge of the capacitor and causes a voltage drop of the capacitor. If a voltage drop of the capacitor is determined, then the methods and systems close the active discharge circuit. In this way, the methods and systems improve the safety and efficacy of performing active discharge by performing active discharge after confirming that the high voltage switch is open and that the battery is disconnected from the capacitor. Moreover, in this way, the methods and systems can reduce and/or eliminate the need for high power resistors in the active discharge circuit. For instance, instead of using a substantially 100 W, 110 W, 120 W, etc. power rating on 400V applications and 380 W, 390 W, 400 W, etc., power rating on 800V applications active discharge resistor, some embodiments herein may implement a substantially 2.5 W, 3 W, 3.5 W, etc. power rating on 400V applications or 8 W, 9 W, 10 W, etc., power rating on 800V applications active discharge resistor, which results in less cost and increased space savings.

With the use of two loads with different power ratings, the probing as to whether active discharge is possible can be done with lower power (currents) and can provide the following advantages. First, the high voltage link being disconnected to power sources can be confirmed by low power load over extended times. Second, the risk of damage to the high current discharge resistor can be removed because of checking for absence of power sources. Third, power resistors can be designed with much less power dissipation capability, thereby reducing cost, needed space, and power losses. Fourth, the low power load can be realized by increasing consumption of already available high voltage power supplies allowing to apply low clearance on the printed circuit (PCB) for additional circuits. Fifth, the probability of successful active discharge in case of system malfunction can be significantly increased because software protection for overheating of power resistors may be avoided. Sixth, monitoring duration and condition of high voltage discharge ability monitoring can be adapted easily to the vehicle architecture, design, and requirements.

Figure 1:
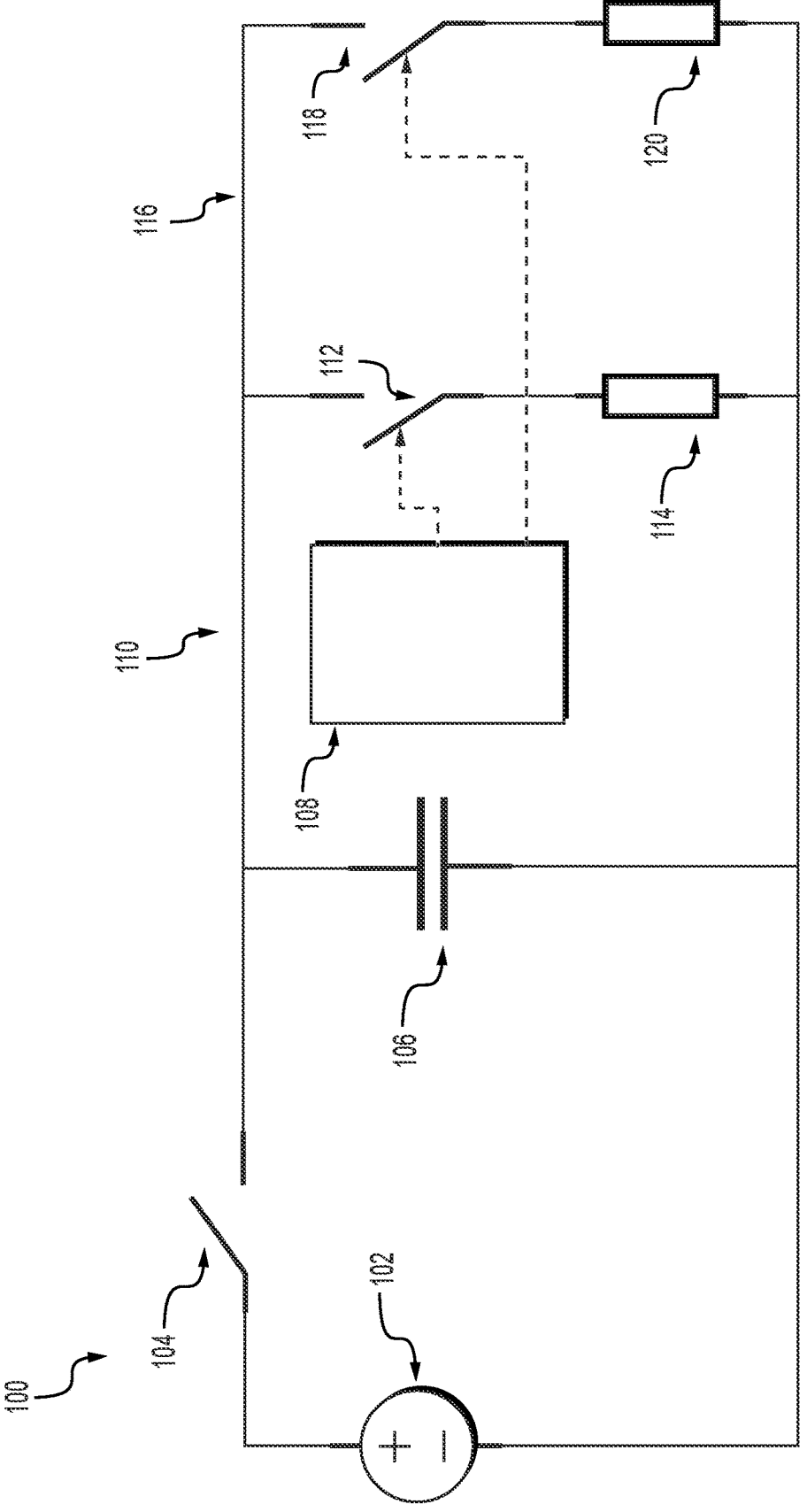
FIG. 1 is a diagram of an example system for performing active discharge using an active discharge circuit and an auxiliary circuit.

FIG. 1 is a diagram of an example system 100 for performing active discharge using an active discharge circuit and an auxiliary circuit. The system 100 may be provided in an electric vehicle (e.g., an automobile, a train, an aircraft, etc.). Moreover, the system 100 may be used in conjunction with an inverter of the electric vehicle.

As shown in FIG. 1, the system 100 may include a battery 102, a high voltage switch 104, and a capacitor 106 (e.g., a bulk capacitor, a DC-link capacitor, or the like). The high voltage switch 104 may connect the battery 102 to the capacitor 106. For instance, if the high voltage switch 104 is closed, then the battery 102 is connected to the capacitor 106. Alternatively, if the high voltage switch 104 is open, then the battery 102 is disconnected from the capacitor 106.

As further shown in FIG. 1, the system 100 may include an active discharge device 108 that is configured to perform operations described below in more detail with connection to FIG. 5, and that includes components described in more detail with connection to FIG. 6.

As further shown in FIG. 1, the system 100 may include an active discharge circuit 110. The active discharge circuit 110 may include an active discharge switch 112, and an active discharge resistor 114. The active discharge switch 112 may connect the capacitor 106 to the active discharge resistor 114. For instance, if the active discharge switch 112 is closed, then the capacitor 106 is connected to the active discharge resistor 114. Alternatively, if the active discharge switch 112 is open, then the capacitor 106 is disconnected from the active discharge resistor 114.

As further shown in FIG. 1, the system 100 may include an auxiliary circuit 116 that is provided in parallel with the active discharge circuit 110. According to an embodiment, the auxiliary circuit 116 may include an auxiliary switch 118 and an auxiliary resistor 120. The auxiliary switch 118 may connect the capacitor 106 to the auxiliary resistor 120. For example, if the auxiliary switch 118 is closed, then the capacitor 106 is connected to the auxiliary resistor 120. Alternatively, if the auxiliary switch 118 is open, then the capacitor 106 is disconnected from the auxiliary resistor 120.

Figure 2:
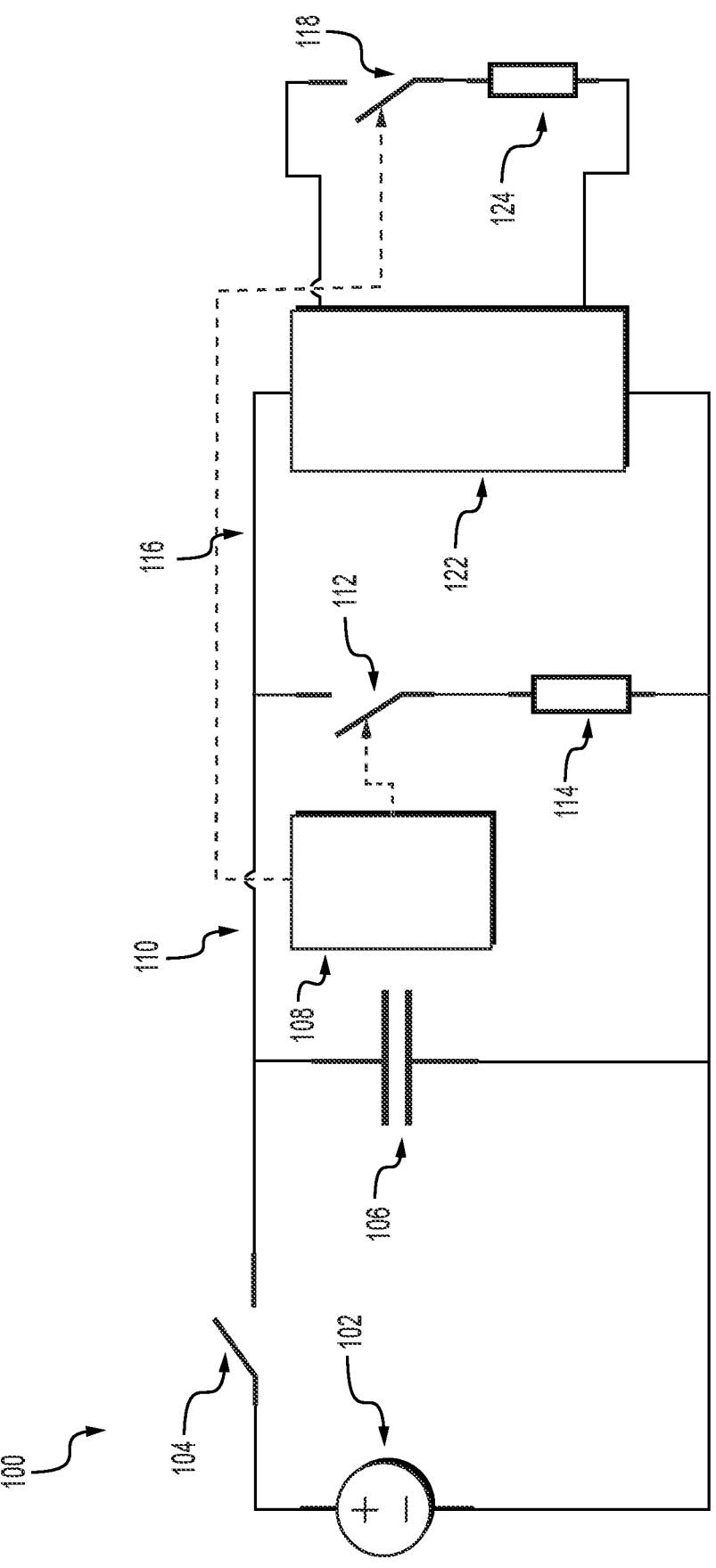
FIG. 2 is a diagram of an example system for performing active discharge using an active discharge circuit and an auxiliary circuit.
Figure 3:
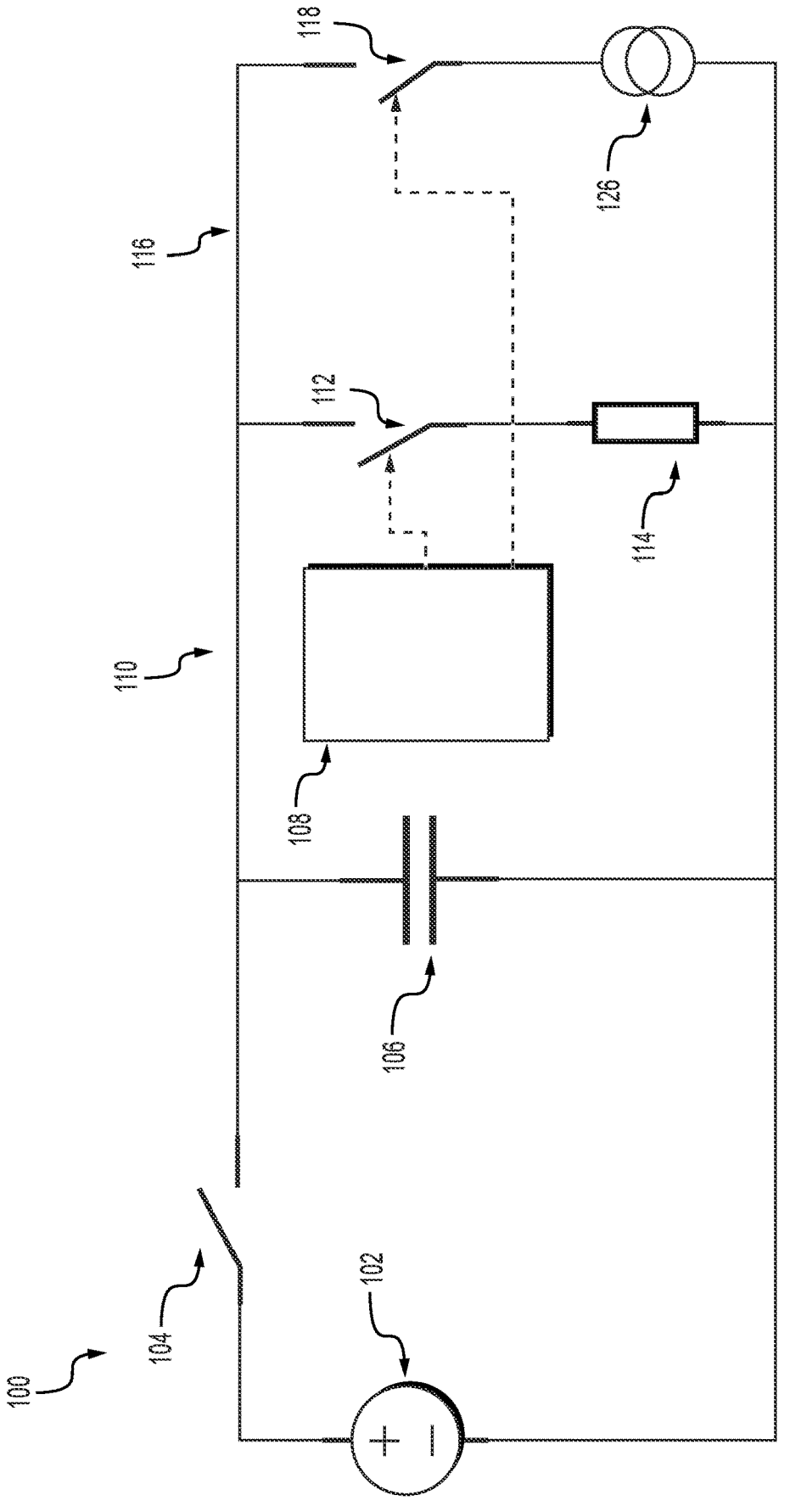
FIG. 3 is a diagram of an example system for performing active discharge using an active discharge circuit and an auxiliary circuit.
Figure 4:
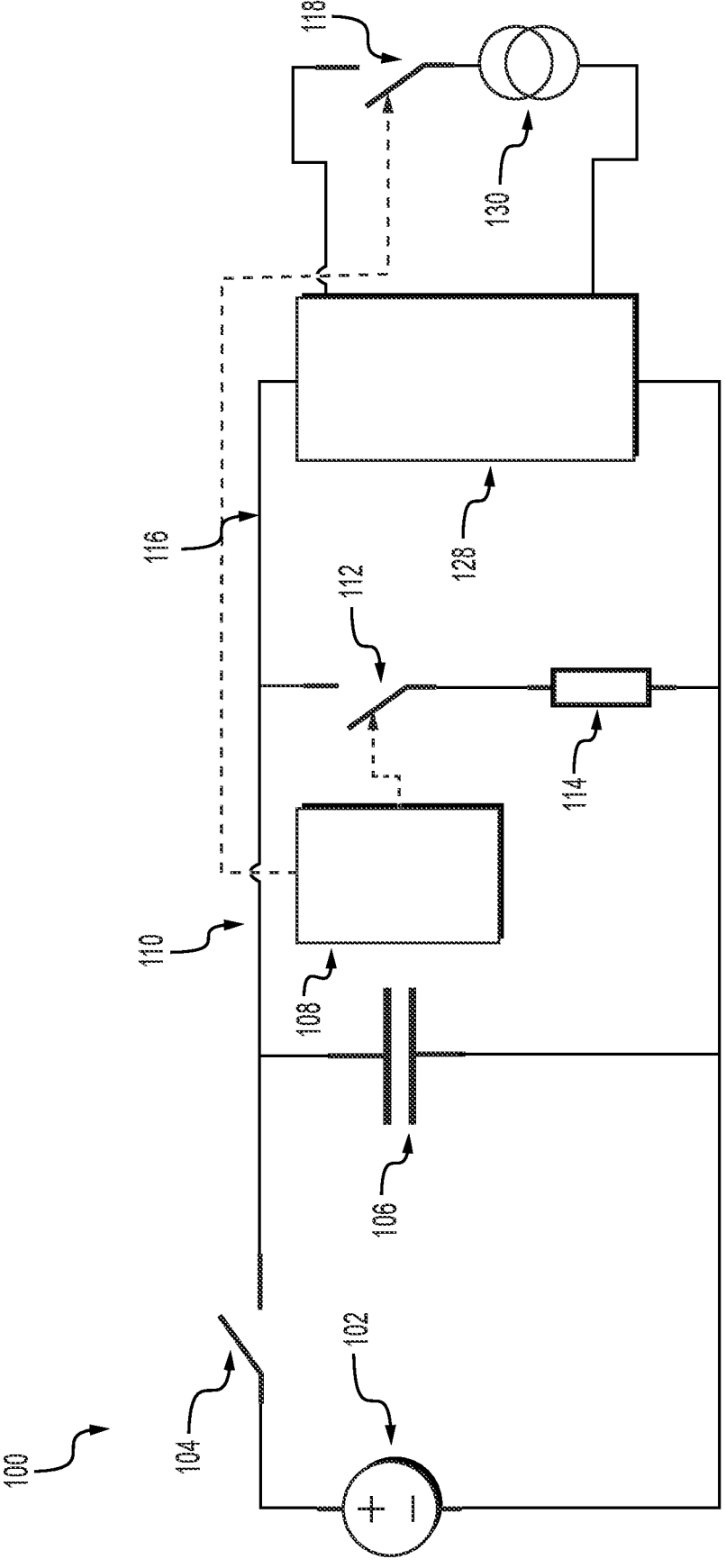
FIG. 4 is a diagram of an example system for performing active discharge using an active discharge circuit and an auxiliary circuit.

According to another embodiment, and as shown in FIG. 2, the auxiliary circuit 116 may include an auxiliary switch 118, a high voltage power supply 122, and an auxiliary resistor 124. In this way, the configuration of FIG. 2 provides less clearance, more inexpensive components as lower voltage rating, and a high voltage independent load. According to yet another embodiment, and as shown in FIG. 3, the auxiliary circuit 116 may include an auxiliary switch 118 and a current source 126. In this way, the configuration FIG. 3 provides the use of a transistor as a load with a simpler cooling interface, and a high voltage independent load. According to yet another embodiment, and as shown in FIG. 4, the auxiliary circuit 116 may include an auxiliary switch 118, a high voltage power supply 128, and a current source 130. In this way, the configuration of FIG. 4 provides the use of a transistor as a load with a simpler cooling interface, a lower voltage rating, less clearance, and a high voltage independent load.

The active discharge resistor 114 may have a first resistance, and the auxiliary resistor 120 may have a second resistance that is greater than the first resistance. As a particular example, the active discharge resistor 114 may be substantially 600 Ohms, 620 Ohms, 640 Ohms, etc., the auxiliary resistor 120 (or the auxiliary resistor 124) may be substantially 90 kilo Ohms, 92 kilo Ohms, 94 kilo Ohms, etc., the power for the high voltage power supply 122 may be substantially 5 watts, 6 Watts, 7 Watts, etc., the current source 126 may be substantially 7 milliamps, 7.5 milliamps, 8 milliamps, etc., and the power for the current source 126 may be substantially 5 watts, 6 Watts, 7 Watts, etc. The active discharge device 108 may be configured to determine a voltage drop of the capacitor 106 within substantially 500 milliseconds. The active discharge resistor 114 may be configured to discharge the capacitor 106 in substantially 1.4 seconds. It should be understood that the embodiments herein may include other values for the foregoing parameters. As used herein, a parameter having "substantially" a particular value may refer to the parameter having a value within +/−5%, 10%, 25%, etc. of the stated particular value. It should be understood that the embodiments herein may include other values determined by the particular application needs and system voltage level for the foregoing parameters.

FIG. 5 is a flowchart of an example process 500 for performing active discharge using an active discharge circuit and an auxiliary circuit.

As shown in FIG. 5, the process 500 may include receiving an active discharge request to perform active discharge of a capacitor of an electric vehicle (operation 510). For example, the active discharge device 108 may receive an active discharge request to perform active discharge of the capacitor 106 of the electric vehicle. The active discharge device 108 may receive the active discharge request from another component of the electric vehicle such as, e.g., a power train coordinator, a high voltage coordinator, or an airbag module. Further, the active discharge device 108 may receive the active discharge request based on a predetermined event (e.g., the ignition being turned off, the electric vehicle being involved in a crash, or the like).

As further shown in FIG. 5, the process 500 may include closing an auxiliary switch of an auxiliary circuit provided in parallel with an active discharge circuit of the electric vehicle (operation 520). For example, the active discharge device 108 may close the auxiliary switch 118 based on the active discharge request. In this case, the active discharge switch 112 may remain open. In this way, the auxiliary circuit 116 may consume some of the charge of the capacitor 106 and cause a voltage drop of the capacitor 106 in the event that the high voltage switch 104 is open.

As further shown in FIG. 5, the process 500 may include determining a voltage drop of the capacitor, based on closing the auxiliary switch (operation 530). For example, the active discharge device 108 may determine a voltage drop of the capacitor 106, based on closing the auxiliary switch 118. The active discharge device 108 may use any suitable voltage measurement technique, and determine a voltage drop of the capacitor 106 based on using the voltage measurement technique.

As further shown in FIG. 5, the process 500 may include closing an active discharge switch of the active discharge circuit to perform the active discharge the capacitor, based on the determining the voltage drop of the capacitor indicating that the battery is disconnected from the capacitor (operation 540). For example, the active discharge device 108 may close the active discharge switch 112, based on determining the voltage drop.

According to an embodiment, the active discharge device 108 may close the active discharge switch 112 based on determining that the voltage drop is greater than the voltage drop threshold. For example, the active discharge device 108 may measure a first voltage of the capacitor 106 at a first time, measure a second voltage of the capacitor at a second time, determine a voltage drop based on the first voltage and the second voltage, determine that the voltage drop is greater than a voltage drop threshold, and close the active discharge switch 112. As a particular example, the active discharge device 108 may determine that a voltage drop of 20V is greater than a voltage drop threshold of 15V, and close the active discharge switch 112. In this case, the voltage drop being greater than the voltage drop threshold is indicative of the high voltage switch 104 being open and the battery 102 being disconnected from the capacitor 106.

According to another embodiment, the active discharge device 108 may close the active discharge switch 112 based on determining the voltage drop is greater than the voltage drop threshold, and that the timeframe of the voltage drop is less than the time threshold. For example, the active discharge device 108 may measure a first voltage of the capacitor 106 at a first time, measure a second voltage of the capacitor at a second time, determine a voltage drop based on the first voltage and the second voltage, determine a timeframe of the voltage drop based on the first time and the second time, determine that the voltage drop is greater than a voltage drop threshold, determine that the timeframe is less than a time threshold and close the active discharge switch 112. As a particular example, the active discharge device 108 may determine that a voltage drop of 20V in 10 milliseconds satisfies a voltage drop threshold of 15V in 20 milliseconds, and close the active discharge switch 112. In this case, the voltage drop being greater than the voltage drop threshold and the timeframe being less than the time threshold are indicative of the high voltage switch 104 being open and the battery 102 being disconnected from the capacitor 106.

According to another embodiment, the active discharge device 108 may close the active discharge switch 112 based on the voltage drop being a certain amount within a certain timeframe. For example, the active discharge device 108 may determine whether the voltage of the capacitor 106 drops by a certain amount in a certain timeframe, and close the active discharge switch 112 based on the voltage dropping by the certain amount within the certain timeframe. As a particular example, the active discharge device 108 may determine whether the voltage of the capacitor 106 drops by 10V in 10 milliseconds. In this case, the voltage dropping by the certain amount in the certain timeframe is indicative of the high voltage switch 104 being open and the battery 102 being disconnected from the capacitor 106.

According to another embodiment, the active discharge device 108 may close the active discharge switch 112 based on the voltage of the capacitor 106 being less than a threshold voltage. For example, the active discharge device 108 may determine whether the voltage of the capacitor 106 is less than a voltage threshold, and close the active discharge switch 112 based on the voltage of the capacitor 106 being less than the voltage threshold. As a particular example, the active discharge device 108 may determine whether the voltage of the capacitor 106 is less than 10V.

In this way, the active discharge device 108 may close the active discharge switch 112 based on conditions that are indicative of the high voltage switch 104 being open and the battery 102 being disconnected from the capacitor 106. Accordingly, active discharge may be performed in a manner than is less likely to result in damage to the active discharge resistor 114.

Based on closing the active discharge switch 112, the active discharge device 108 may monitor and/or determine one or more of the conditions mentioned above, and selectively open the active discharge switch 112 based on determining the one or more of the conditions mentioned above. In this case, the active discharge device 108 may use the same, similar, or different thresholds or parameters as mentioned above. If the active discharge device 108 determines that the one or more conditions are satisfied, then the active discharge device 108 may maintain the close state of the active discharge switch 112. Alternatively, if the active discharge device 108 determines that the one or more conditions are not satisfied, then the active discharge device 108 may open the active discharge switch 112. The conditions mentioned before may be maintained in software and adaptable by software change to given conditions.

Figure 6:
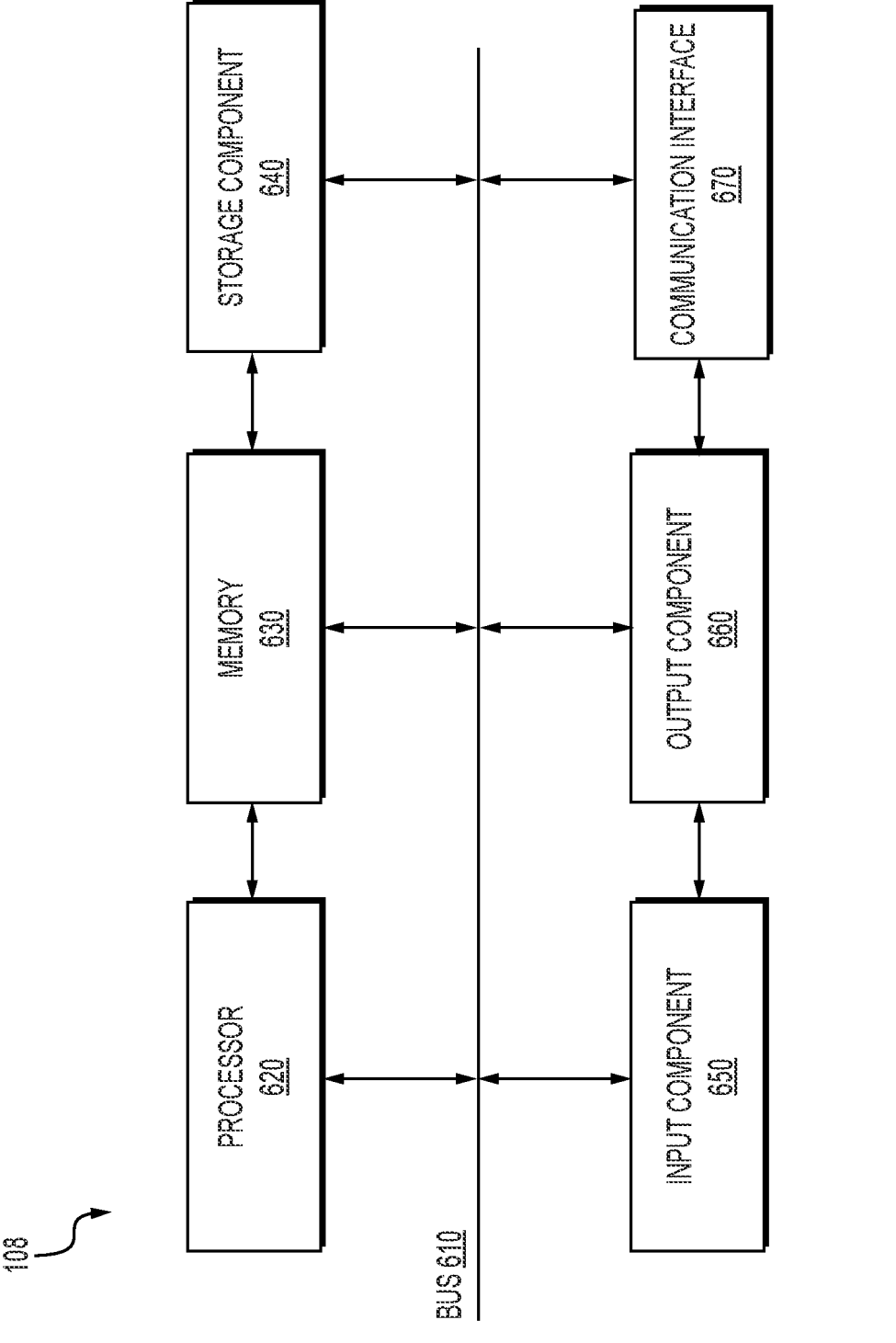
FIG. 6 is a diagram of example components of an active discharge device.

FIG. 6 is a diagram of example components of an active discharge device. The components may include a bus 610, a processor 620, a memory 630, a storage component 640, an input component 650, an output component 660, and a communication interface 670.

The bus 610 includes a component that permits communication among the components. The processor 620 may be implemented in hardware, firmware, or a combination of hardware and software. The processor 620 may be a central processing unit (CPU), a graphics processing unit (GPU), an accelerated processing unit (APU), a microprocessor, a microcontroller, a digital signal processor (DSP), a fieldprogrammable gate array (FPGA), an application-specific integrated circuit (ASIC), or another type of processing component.

The processor 620 may include one or more processors capable of being programmed to perform a function. The memory 630 may include a random access memory (RAM), a read only memory (ROM), and/or another type of dynamic or static storage device (e.g., a flash memory, a magnetic memory, and/or an optical memory) that stores information and/or instructions for use by the processor 620.

The storage component 640 may store information and/or software related to the operation and use of the components. For example, the storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 650 may include a component that permits the components to receive information, such as via user input (e.g., a touch screen display, a keyboard, a keypad, a mouse, a button, a switch, and/or a microphone for receiving the reference sound input). Additionally, or alternatively, the input component 650 may include a sensor for sensing information (e.g., a global positioning system (GPS) component, an accelerometer, a gyroscope, and/or an actuator). The output component 660 may include a component that provides output information from the components (e.g., a display, a speaker for outputting sound at the output sound level, and/or one or more light-emitting diodes (LEDs)).

The communication interface 670 may include a transceiver-like component (e.g., a transceiver and/or a separate receiver and transmitter) that enables the components to communicate with other devices, such as via a wired connection, a wireless connection, or a combination of wired and wireless connections. The communication interface 670 may permit the components to receive information from another device and/or provide information to another device. For example, the communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

The components may perform one or more processes described herein. The components may perform these processes based on the processor 620 executing software instructions stored by a non-transitory computer-readable medium, such as the memory 630 and/or the storage component 640. A computer-readable medium may be defined herein as a non-transitory memory device. A memory device may include memory space within a single physical storage device or memory space spread across multiple physical storage devices.

The software instructions may be read into the memory 630 and/or the storage component 640 from another computer-readable medium or from another device via the communication interface 670. When executed, the software instructions stored in the memory 630 and/or the storage component 640 may cause the processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 6 are provided as an example. In practice, the components may include additional components, fewer components, different components, or differently arranged components than those shown in FIG. 6. Additionally, or alternatively, a set of components (e.g., one or more components) may perform one or more functions described as being performed by another set of components.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

We claim:

1. A method comprising:

receiving a discharge request to perform discharge of a capacitor of an electric vehicle;

closing a first switch of a first circuit provided in parallel with a second circuit of the electric vehicle;

determining a voltage drop of the capacitor, based on closing the first switch; and closing a second switch of the second circuit to perform the discharge of the capacitor, based on the determining the voltage drop of the capacitor indicating that a battery of the electric vehicle is disconnected from the capacitor.

2. The method of claim 1, further comprising:

determining that the voltage drop of the capacitor is greater than a voltage drop threshold, wherein closing the second switch comprises closing the second switch based on determining that the voltage drop is greater than the voltage drop threshold and determining that a timeframe of the voltage drop is less than a timeframe threshold.

3. The method of claim 1, further comprising:

determining that a timeframe of the voltage drop is less than a timeframe threshold, wherein closing the second switch comprises closing the second switch based on determining that the voltage drop of the capacitor is greater than a voltage drop threshold and determining that the timeframe of the voltage drop is less than the timeframe threshold.

4. The method of claim 1, wherein the first circuit includes the first switch and a first resistor.

5. The method of claim 1, wherein the first circuit includes the first switch, a high voltage power supply, and a first resistor.

6. The method of claim 1, wherein the first circuit includes the first switch and a current source.

7. The method of claim 1, wherein the first circuit includes the first switch, a high voltage power supply, and a current source.

8. The method of claim 1, further comprising:

after closing the second switch, determining a second voltage drop of the capacitor; and selectively opening the second switch after closing the second switch based on determining the second voltage drop of the capacitor.

9. An electric vehicle comprising:

a first circuit;

a second circuit configured to perform discharge of a capacitor of the electric vehicle; and a processor configured to:

receive a discharge request to perform the discharge of the capacitor of the electric vehicle;

close a first switch of the first circuit provided in parallel with the second circuit of the electric vehicle;

determine a voltage drop of the capacitor, based on closing the first switch; and close a second switch of the first circuit to perform the discharge the capacitor, based on the determining the voltage drop of the capacitor indicating that a battery of the electric vehicle is disconnected from the capacitor.

10. The electric vehicle of claim 9, wherein the processor is further configured to:

determine that the voltage drop of the capacitor is greater than a voltage drop threshold, wherein the processor, when closing the second switch, is configured to close the second switch based on determining that the voltage drop is greater than the voltage drop threshold and determining that a timeframe of the voltage drop is less than a timeframe threshold.

11. The electric vehicle of claim 9, wherein the processor is further configured to:

determine that a timeframe of the voltage drop is less than a timeframe threshold, wherein the processor, when closing the second switch, is configured to close the second switch based on determining that the timeframe of the voltage drop is less than the timeframe threshold.

12. The electric vehicle of claim 9, wherein the first circuit includes the first switch and a first resistor.

13. The electric vehicle of claim 9, wherein the first circuit includes the first switch, a high voltage power supply, and a first resistor.

14. The electric vehicle of claim 9, wherein the first circuit includes the first switch and a current source.

15. The electric vehicle of claim 9, wherein the first circuit includes the first switch, a high voltage power supply, and a current source.

16. The electric vehicle of claim 9, wherein the processor is further configured to:

after closing the second switch, determine a second voltage drop of the capacitor; and selectively open the second switch after closing the second switch based on determining the second voltage drop of the capacitor.

17. A discharge device comprising:

a memory configured to store instructions; and a processor configured to execute the instructions to:

receive a discharge request to perform discharge of a capacitor of an electric vehicle;

close a first switch of a first circuit provided in parallel with a second circuit of the electric vehicle;

determine a voltage drop of the capacitor, based on closing the first switch; and close a second switch of the second circuit to perform the discharge the capacitor, based on the determining the voltage drop of the capacitor indicating that a battery of the electric vehicle is disconnected from the capacitor.

18. The discharge device of claim 17, wherein the processor is further configured to:

determine that the voltage drop of the capacitor is greater than a voltage drop threshold, wherein the processor, when closing the second switch, is configured to close the second switch based on determining that the voltage drop is greater than the voltage drop threshold and determining that a timeframe of the voltage drop is less than a timeframe threshold.

19. The discharge device of claim 17, wherein the processor is further configured to:

determine that a timeframe of the voltage drop is less than a timeframe threshold, wherein the processor, when closing the second switch, is configured to close the second switch based on determining that the voltage drop of the capacitor is greater than a voltage drop threshold and determining that the timeframe of the voltage drop is less than the timeframe threshold.

20. The discharge device of claim 17, wherein the processor is further configured to:

after closing the second switch, determine a second voltage drop of the capacitor; and selectively open the second switch after closing the second switch based on determining the second voltage drop of the capacitor.

\* \* \* \* \*